(12) United States Patent
Cheng et al.

(10) Patent No.: US 9,852,359 B2
(45) Date of Patent: Dec. 26, 2017

(54) SYSTEM, METHOD, AND RECORDING MEDIUM FOR EFFICIENT COHESIVE SUBGRAPH IDENTIFICATION IN ENTITY COLLECTIONS FOR INLIER AND OUTLIER DETECTION

(71) Applicant: International Business Machines Corporation, Armonk, NY (US)

(72) Inventors: Yu Cheng, Ossining, NY (US); Sharathchandra U. Pankanti, Darien, CT (US); Nalini K. Ratha, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

(21) Appl. No.: 14/853,028

(22) Filed: Sep. 14, 2015

(65) Prior Publication Data
US 2017/0076178 A1    Mar. 16, 2017

(51) Int. Cl.
*G06K 9/62* (2006.01)
*G06K 9/00* (2006.01)

(52) U.S. Cl.
CPC ....... *G06K 9/6215* (2013.01); *G06K 9/00228* (2013.01); *G06K 9/00442* (2013.01); *G06K 9/00677* (2013.01); *G06K 9/6218* (2013.01); *G06K 9/6296* (2013.01)

(58) Field of Classification Search
None
See application file for complete search history.

(56) References Cited

U.S. PATENT DOCUMENTS

| | | | | |
|---|---|---|---|---|
| 8,320,617 B2* | 11/2012 | Krahnstoever | .... | G06K 9/00295 348/143 |
| 8,705,810 B2* | 4/2014 | Wang | ................ | G06F 17/30781 382/103 |
| 8,819,078 B2* | 8/2014 | Roy | .................. | G06F 17/30073 707/802 |
| 2009/0099920 A1* | 4/2009 | Aharoni | ................. | G06Q 30/02 705/14.26 |

(Continued)

OTHER PUBLICATIONS

Lee et al. "CAST: A Context-Aware Story-Teller for Streaming Social Content," CIKM '14 Proceedings of the 23rd ACM International Conference on Conference on Information and Knowledge Management, pp. 789-798, Nov. 3-7, 2014.*

(Continued)

*Primary Examiner* — Matthew Bella
*Assistant Examiner* — Soo Shin
(74) *Attorney, Agent, or Firm* — Yeen Tham, Esq.; McGinn IP Law Group, PLLC (57) ABSTRACT

A similarity detection system receiving a plurality of input entities, the system including a cohesive subgraph identification device configured to calculate, based on attributes of the plurality of input entities, a first parameter and a second parameter based on the first parameter, and further configured to identify a plurality of subgraphs from the second parameter and a subgraph correlation tracking and clustering device configured to determine a relationship between different subgraphs based on a similarity factor between the second parameter and the plurality of subgraphs.

14 Claims, 9 Drawing Sheets

(56) References Cited

U.S. PATENT DOCUMENTS

| 2009/0136103 A1* | 5/2009 | Sonka ................. G06K 9/4638 |
| --- | --- | --- |
| | | 382/128 |
| 2011/0082670 A1* | 4/2011 | McAuley ................ G06F 17/10 |
| | | 703/2 |
| 2011/0103682 A1* | 5/2011 | Chidlovskii ......... G06K 9/6284 |
| | | 382/159 |
| 2011/0221769 A1* | 9/2011 | Leung .................... G06K 9/469 |
| | | 345/633 |
| 2017/0221240 A1* | 8/2017 | Stetson ................ G06T 11/206 |
| | | 715/215 |

OTHER PUBLICATIONS

Zhao et al. "From Dense Subgraph to Graph Matching: A Label Propagation Approach," IEEE 2014 International Conference on Audio, Language and Image Processing (ICALIP), Jul. 7-9, 2014.*
International Patent Application Publication No. WO 2004/051544.*
Cordella, et al. "A (sub) graph isomorphism algorithm for matching large graphs." Pattern Analysis and Machine Intelligence, IEEE Transactions on 26. 10 (2004): 1367-1372.
Baya, et al. "Improved graph-based metrics for clustering high-dimensional datasets." Advances in Artificial Intelligence—IBERAMIA 2010. Springer Berlin Heidelberg, 2010. 184-193.
Meng, et al. "Nonlinear dimensionality reduction of data lying on the multicluster manifold." Systems, Man, and Cybernetics, Part B: Cybernetics, IEEE Transactions on 38.4 (2008):1111-1122.
Ll, et al. "Structured Space Error Coding for Face Recognition With Occlusion," IEEE Transactions on Image Processing, vol. 22, No. 5, May 2013.

* cited by examiner

---
Algorithm 1 $(k, d)$-Cores Generation: Zigzag
---
1: Input: $G(V, E)$, $k$, $d$
2: Output: All maximal $(k, d)$-Cores
3: Generate a set of $k$-Cores $G_1$ by removing nodes with degree less than $k$ recursively from $G(V, E)$.
4: While $G_1$ is not empty
5:   Generate a set of $(d + 1, d)$-Cores $G_2$ by removing edges with witnesses less than $d$ recursively from $G_1$;
6:   if $G_1$ equals $G_2$ then;
7:     break;
8:   Generate a set of $k$-Cores $G_2$ by removing edges with witnesses less than $d$ recursively from $G_1$;
9:   if $G_1$ equals $G_2$ then;
10:    break;
11: return $G_1$;

FIG. 6b

---
Algorithm 2 $(k, d)$-Cores Generation: NodeFirst
---
1: Input: $G(V, E)$, $k$, $d$
2: Output: All maximal $(k, d)$-Cores
3: Generate a set of $k$-Cores $G'$ by removing nodes with degree less than $k$ recursively from $G(V, E)$.
4: While $G'$ is not empty do
5:   Find an edge $e(p_i, p_j)$ with less than $d$ witnesses;
6:   if $e(p_i, p_j)$ exists then;
7:     delete $e(p_i, p_j)$ from $G'$;
8:     if $Deg(p_i) < k$ or $Deg(p_j) < k$ then;
9:       Remove nodes with degree less than $k$;
10:  Recursively from $G'$;
11:  else;
12:    break;
13: return $G_1$;

Algorithm 3 Outlier Detection
---
1: Input: $G(V, E)$, $Story_{1:n}$, $l$, $\sigma$, $c$
2: Output: Story correlation graph SCG
3: Generate SCG with empty node set and edge set;
4: for each $Story_i \in Story_{1:n}$ do
5:     Create a node $v_i$ in SCG;
6: for each $Story_i = g_i(V_i, E_i)$ in $Story_{1:n}$ do;
7:     Source=$V_i$;
8:     PathSet=;
9:     NeighborSet=;
10:     each node $p_i$ in Source do;
11:         generate simple paths within $l$ hops starting;
12:         from $p_i$ and add into PathSet;
13:     for each path $\in$ PathSet do
14:         Suppose the path end node $p_i$ is in $g_i(V_j, E_j)$;
15:         Aggregate $Sim(path)$ into $PA(Source, V_j)$;
16:         Add $g_i(V_j, E_j)$ into NeighborSet;
17:     each $Story_j \in$ NeighborSet do
18:         $Corr(g_i, g_j) = PA(Source, V_j)$;
19:         if $Corr(g_i, g_j) \geq \sigma$ then
20:         Create an edge $e(v_i, v_j)$ in SCG with
21:         weight $Corr(g_i, g_j)$;
22: return SCG;

SYSTEM, METHOD, AND RECORDING MEDIUM FOR EFFICIENT COHESIVE SUBGRAPH IDENTIFICATION IN ENTITY COLLECTIONS FOR INLIER AND OUTLIER DETECTION

This invention was made with Government support under Contract No.: H98230-11-C-0276 awarded by the Department of Defense (DoD). The Government has certain rights in this invention.

BACKGROUND

The present invention relates generally to image processing, and more particularly, but not by way of limitation, to a system, a method, and a recording medium including inputting entities, outlier objects can be detected via efficient cohesive subgraph identification, and outputting two lists; outlier entities and inlier entities.

In conventional media collection containing facial imagery, often times there is only a small portion of the collection that is relevant to a person of interest. The rest of the collection is of zero value but adds a significant burden on the user or an analyst to be able to remove them from the collection.

Conventionally, outlier detection has been performed via geometric-based methods, such as PCA, Kernel PCA, Robust PCA, or Robust Kernel PCA.

Other conventional methods have performed outlier detection by probabilistic modeling method, such as, kernel density estimator (KDE) and robust kernel density estimator (RKDE).

Another conventional outlier detection method has proposed performing the outlier detection by a learning method such as one-class support vector machines (OC-SVMs) or support vector data description (SVDD).

However, each conventional outlier detection method above, and all other conventional outlier detection methods are limited in their application in that they have a high computational cost on a large dataset, require prior knowledge, and difficult to be extended to an online case.

SUMMARY

In view of the foregoing and other problems, disadvantages, and drawbacks of the aforementioned background art, it is desirable to provide an improved way to perform similarity detection between input entities and automatically eliminate outliers/inliers scattering among practical data collections.

An exemplary aspect of the disclosed invention provides a system, method, and non-transitory recording medium for detecting similarities between entities.

In an exemplary embodiment, the present invention can provide a similarity detection system receiving a plurality of input entities, the system including a cohesive subgraph identification device configured to calculate, based on attributes of the plurality of input entities, a first parameter and a second parameter from the first parameter, and further configured to identify a plurality of subgraphs from the second parameter and a subgraph correlation tracking and clustering device configured to determine a relationship between different subgraphs based on a similarity factor between the second parameter and the plurality of subgraphs.

Further, in another exemplary embodiment, the present invention can provide a similarity detection method, including receiving a plurality of input entities, calculating, based on attributes of the plurality of input entities, a first parameter and a second parameter from the first parameter, identifying a plurality of subgraphs from the second parameter, and determining a relationship between different subgraphs based on a similarity factor between the second parameter and the plurality of subgraphs.

Even further, in another exemplary embodiment, the present invention can provide a non-transitory computer-readable recording medium recording a similarity detection program, the program causing a computer to perform receiving a plurality of input entities, calculating, based on attributes of the plurality of input entities, a first parameter and a second parameter from the first parameter, identifying a plurality of subgraphs from the second parameter, and determining a relationship between different subgraphs based on a similarity factor between the second parameter and the plurality of subgraphs.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

The invention will now be described with reference to FIGS. 1-9, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

It should be noted that the exemplary embodiments described herein relate generally to facial images. However, the invention is not limited to facial image detection and/or to similarities between facial images. That is, the invention can be related to any input entities to detect inlier and outliers within the entities based on similarities between the entities which the attributes of the entities can be represented mathematically (i.e., as a matrix or vector). Further, the invention can be broadly related to any list of input entities to detect inlier and outliers within the list of input entities such as words or lists of words. Thus, the entities input into the similarity detection system 101 do not need to be images, but can be any entities in which similarity is desired to be detected. The exemplary embodiment of facial image input is merely done for ease of explanation but, in no way limits the invention.

Figure 1:
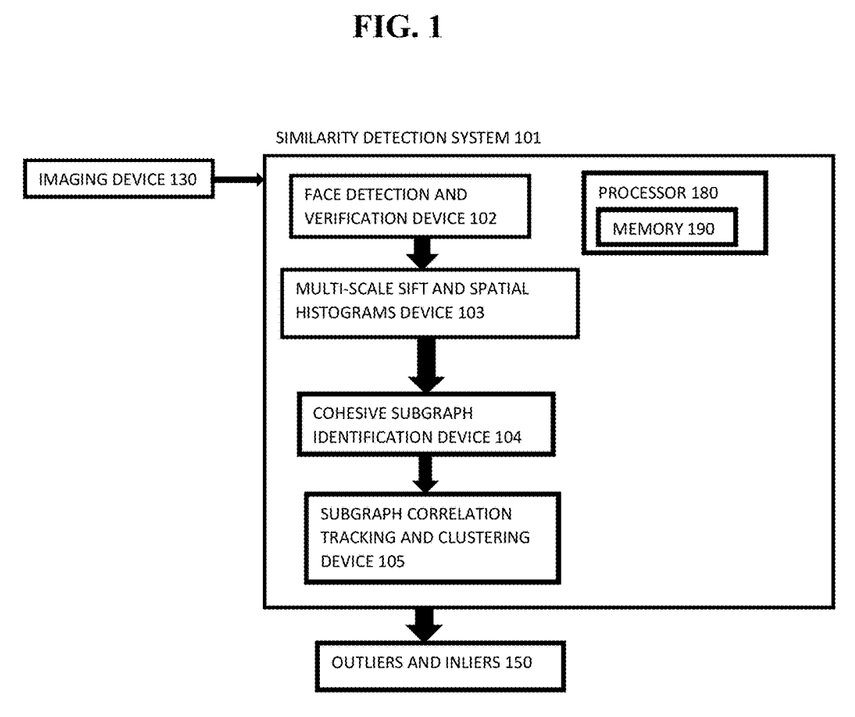
FIG. 1 exemplarily shows a block diagram illustrating a configuration of a similarity detection system 101.

With reference now to FIG. 1, the similarity detection system 101 comprises a face detection and verification device 102, a multi-scale scale-invariant feature transform (SIFT) and spatial histograms device 103, a cohesive subgraph identification device 104, and a subgraph correlation tracking and clustering device 105. The similarity detection system 101 receives a plurality of input images (entities) from an imaging device 130. The similarity detection system 101 includes a processor 180 and a memory 190, with the memory 190 storing instructions to cause the processor 180 to execute each device of the similarity detection system 101.

Figure 7:
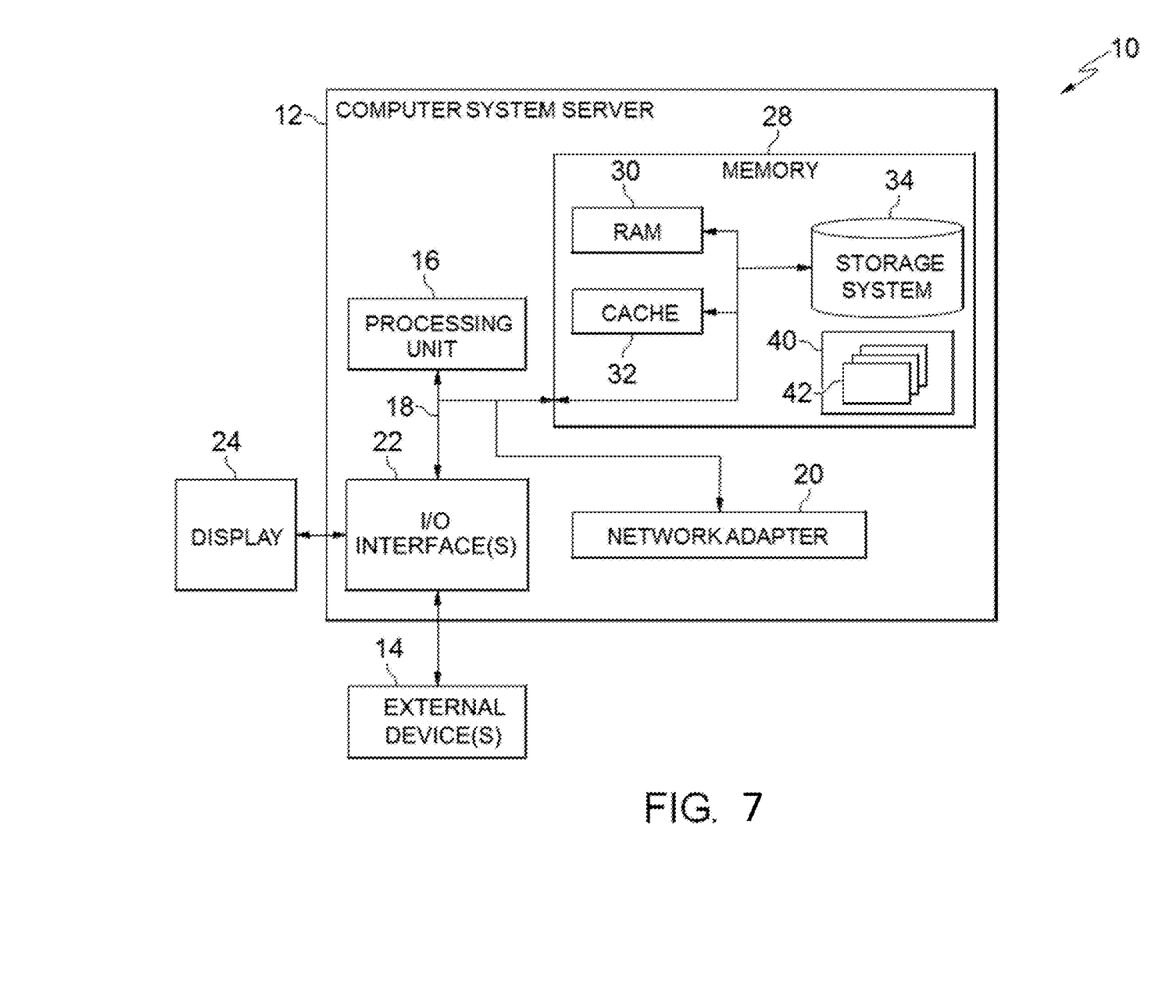
FIG. 7 depicts a cloud computing node according to an embodiment of the present invention.
Figure 8:
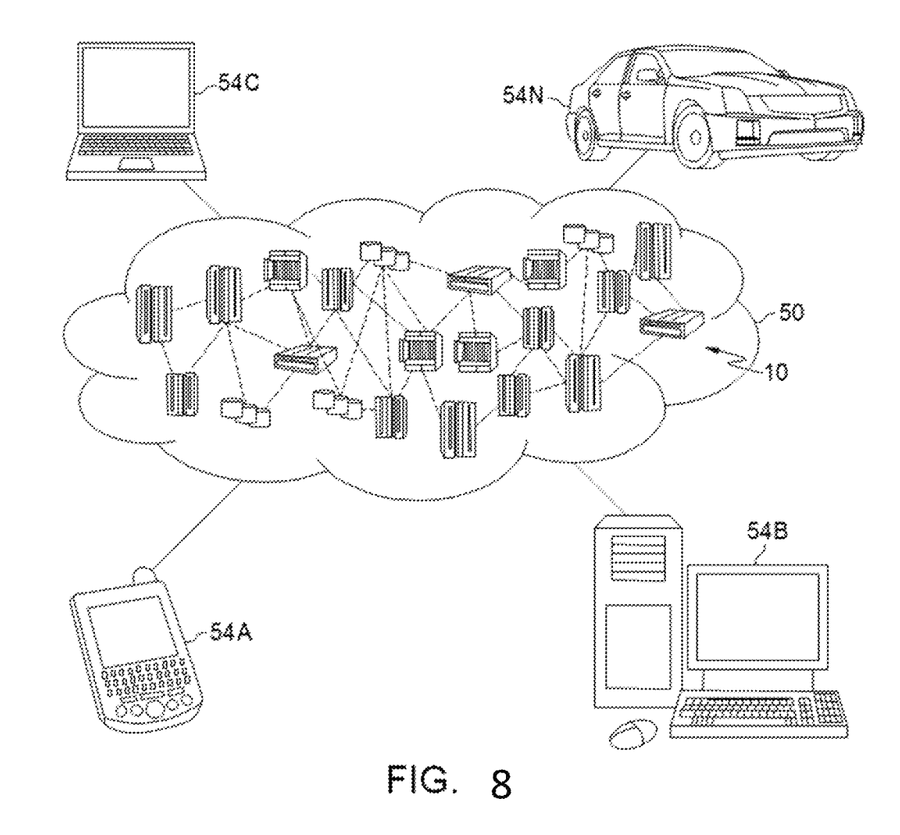
FIG. 8 depicts a cloud computing environment according to an embodiment of the present invention.
Figure 9:
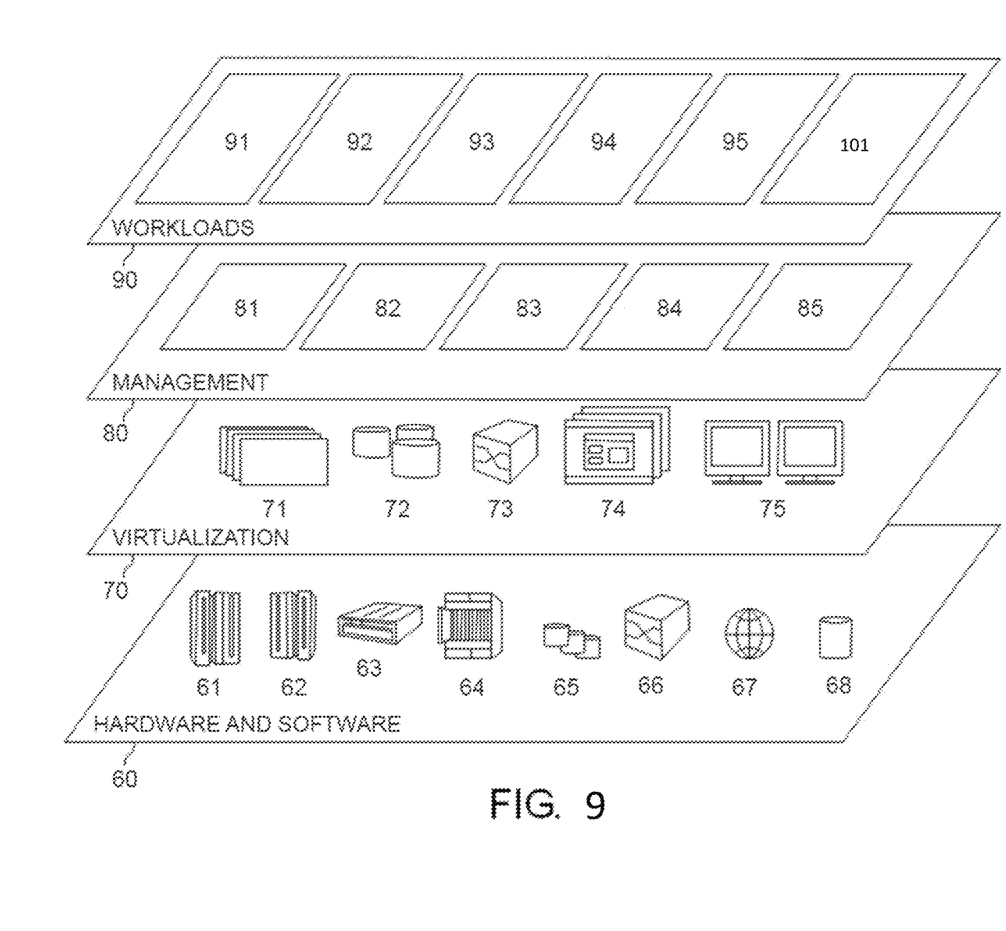
FIG. 9 depicts abstraction model layers according to an embodiment of the present invention.

Although as shown in FIGS. 7-9 and as described later, the computer system/server 12 is exemplarily shown in cloud computing node 10 as a general-purpose computing device which may execute in a layer the similarity detection system 101 (FIG. 9), it is noted that the present invention can be implemented outside of the cloud environment.

Figure 3:
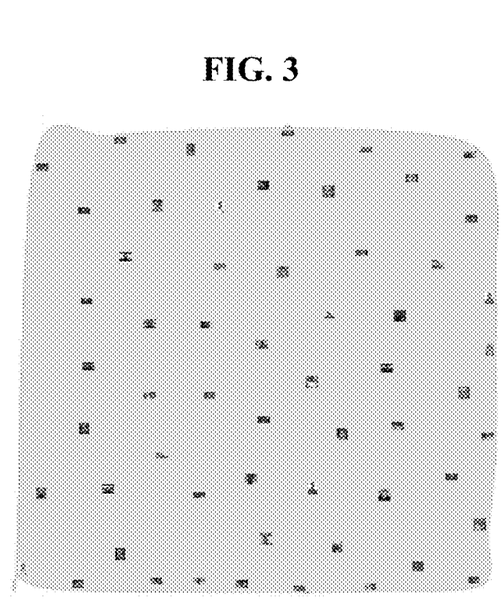
FIG. 3 exemplarily shows an example of detected outliers.
Figure 4:
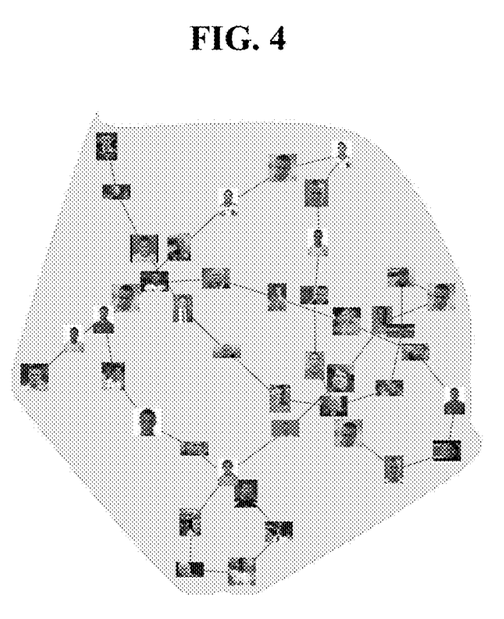
FIG. 4 exemplary shows an example of detected inliers.

Given a list of input images containing multiple images, the similarity detection system 101 can output two lists of face images as shown in FIGS. 3 and 4; outlier images and inlier images. That is, for the image list, the similarity detection system provides an efficient approach for automatically removing outliers faces from noisy list images. The image list may include static images.

The imaging device 130 inputs a list of face images with different persons faces into the similarity detection system 101. The list of face images can be obtained as crawled images from a website, for example. In another exemplary embodiment, a web search can be performed for a person of interest (or object). The resulting images from the web search can be crawled into an image list and input into the similarity detection system 101. Further, in another exemplary embodiment, the list of images may be compiled manually.

The face detection and verification device 102 extracts a face region from the original image of the images and extracts shift features from the face region. The face detection and verification device 102 excludes items in an image that may look like a face, but are not a real face of a person (e.g., a "smiley face" drawn on a wall).

In other words, the face detection and verification device 102 identifies the region of an image that is in fact a face and verifies that that region is actually a face of a person. Further, the face detection and verification device 102 verifies that only one face exists in the image. That is, the face detection and verification device 102 identifies the number of face regions detected in the image and would remove images from the input list with multiple faces in the image. The filtered image list by face detection and verification device 102 will contain images with only a single face. Face detection and verification device 102 may verify faces (or objects) according to known methods. Also, the face detection and verification device 102 can verify that one entity is in each of the entities which are input into the similarity detection system. That is, the face detection and verification device 102 can detect and verify entities.

The multi-scale SIFT and spatial histograms device 103 receives the filtered list of images from the face detection and verification device 102 and transforms the images into similar vectors such that a distance between points on the images can be detected to calculate a similarity between images. That is, the filtered list of images can contain images of different sizes, lighting, pose, etc. (i.e., 100 pixels by 100 pixels for one image and 150 pixels by 150 pixels for another image). The multi-scale SIFT and spatial histograms device 103 detects fixed features out of each image. Multi-scale SIFT is a known technique in the field to detect fixed features from an input image.

The multi-scale SIFT and spatial histograms device 103 transforms each input image to output a same size vector such that analysis can be done and distances between vector points can be determined in order to calculate similarity between images. In other words, no matter what the input size of the image to the multi-scale SIFT and spatial histograms device 103, the multi-scale SIFT and spatial histograms device 103 will transform all of the images into a same size vector (or matrix). Further, the multi-scale SIFT and spatial histograms device 103 matches each vector to each other between all of the images. The multi-scale SIFT and spatial histograms device 103 outputs a fixed size feature vector (or matrix) to the cohesive subgraph identification device 104. For example, if the list of images input into the similarity detection system 101 includes three images, the multi-scale SIFT and spatial histograms device 103 will output three 4,096 diamond shell vectors (i.e., fixed size feature vectors) for each image.

The cohesive subgraph identification device 104 generates a subgraph for all the input images, where each vertex from the fixed size feature vector represents the face image, and edges represent the similarity between two face image features.

Figure 6A:
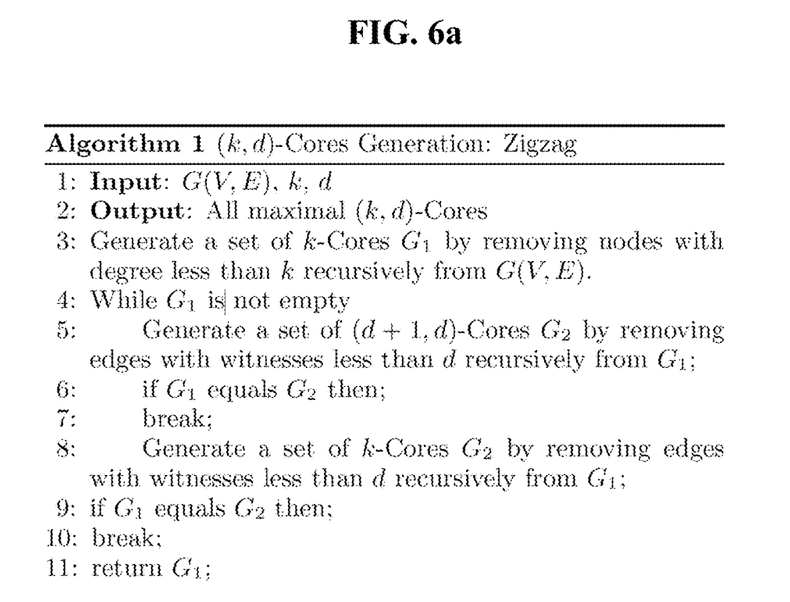
FIG. 6a exemplary shows (k, d) cores generation by a "Zigzag" algorithm used by the cohesive subgraph identification device 104.
Figure 6B:
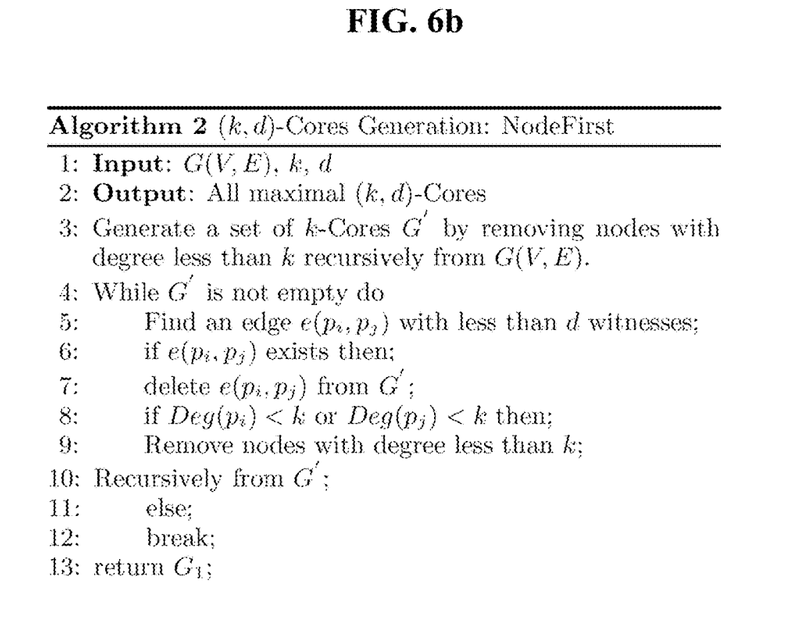
FIG. 6b exemplary shows (k, d) cores generation by a "NodeFirst" algorithm used by the cohesive subgraph identification device 104.

The cohesive subgraph identification device 104 generates k-cores from the fixed size feature vector, further generates (k, d) cores via a Zigzag algorithm (algorithm 1 as depicted in FIG. 6a) or NodeFirst algorithm (algorithm 2 as depicted in FIG. 6b), and identifies subgraphs from the (k, d) core structure.

More specifically, the cohesive subgraph identification device 104 generates k-cores from all nodes represented as $g(V_g,E_g)$ of the fixed size feature matrix. The k-Cores are generated in polynomial time. By adjusting k, the cohesive subgraph identification device 104 generates k-Cores with desired edge density $|E_g|/|V_g|$. For example, increasing k will improve edge density because min(g) is increased and $|V_g|$ is decreased in the same time.

Further, the cohesive subgraph identification device 104 generates (k, d) cores via a Zigzag algorithm (algorithm 1 as depicted in FIG. 6a) or NodeFirst algorithm (algorithm 2 as depicted in FIG. 6b). A transient cluster in image stream Q is defined by a (k, d)-Core $g(V_g,E_g)$ in post network G(V,E), where k>d>0 and;

(1) For every post $p \epsilon V_g, |N(p)| \leq k$ (2) For every edge $e(p_i,p_j) \epsilon E_g, |N(p_i) \cap N(p_j)| \leq d$ \hfill (1)

In (k, d)-Cores, the cohesive subgraph identification device 104 uses k to adjust the edge density, and uses d to control the strength of similarity witness. That is, the (k, d)-Cores have an additional factor to control the strength of the similarity between subgraphs generated than k-Cores. The cohesive subgraph identification device 104 is thus able to generate a maximal (k, d)-Core which is a subgraph of a maximal k-Core. However, as compared with k-Core, (k, d)-Cores have a more cohesive internal structure enhanced by at least d common neighbors as witnesses of commonality between the nodes connected by each edge. This enhancement makes posts in (k, d)-Core are more likely to tell the same story.

Figure 5A:
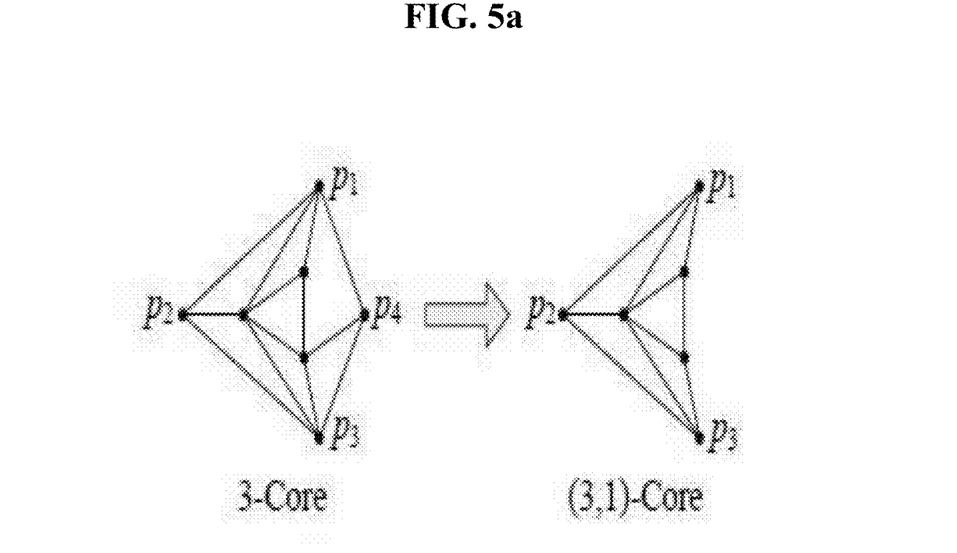
FIG. 5a exemplary shows a k 3-Core and a (k,d) (3,1)-Core.

An example of 3-Core and (3,1)-Core is exemplarily shown in FIG. 5a; p4 is in 3-Core but not in (3,1)-Core, because the similarity between p1 and p4 is not witnessed by other posts.

This defines a new kind of cohesive subgraph called k-Dense, in which every edge has at least k witnesses. A k-Dense is a (k, k+1)-Core. Thus, k-Dense cannot provide users the flexibility to adjust k and d independently. Therefore, a (k, d)-Core generated by the cohesive subgraph identification device 104 is a better definition than k-Cores and k-Dense.

The cohesive subgraph identification device 104 generates (k, d) cores via a Zigzag algorithm (algorithm 1 as depicted in FIG. 6a) or NodeFirst algorithm (algorithm 2 as depicted in FIG. 6b).

Given a network G(V,E), the cohesive subgraph identification device 104 recursively removes the nodes with degree less than k from G(V,E), until all the remaining nodes have a degree at least k. The result is a set of k-Cores. The k-Cores can be obtained in polynomial time and the k-Cores form the basis for the (k, d)-Cores generation algorithms.

In an exemplary embodiment, the cohesive subgraph identification device 104 generates the (k, d)-Cores according to the "Zigzag" algorithm of FIG. 6a. It should be noted that the algorithm is named "Zigzag" because it is repeatedly changing the property of the current network between two states: the first state is (k, d)-Core set G1 obtained by nodes recursively, and the second state is (d+1, d)-Core (or d-Dense) set G2 obtained by removing edges recursively. The Zigzag process will end if each connected component in the result set is a (k, d)-Core, or the result set is empty. The Zigzag algorithm takes polynomial time and the result is exact.

Given a network G(V,E) and numbers k and d, removing n nodes with degree less than k recursively can be more efficient than removing n edges with less than d witnesses recursively in generating (k, d)-Cores.

That is, deleting an edge needs to check the common neighbors of two end posts, while deleting a node only needs to check its degree. Moreover, since |E|>>|V|, deleting one node will remove many edges at the same time, making the network shrink fast.

Therefore, in another exemplary embodiment, the cohesive subgraph identification device 104 generates the (k, d)-Cores according to the "NodeFirst" algorithm as exemplarily shown in FIG. 6b.

The NodeFirst algorithm can improve on the Zigzag algorithm by applying node deletions as much as possible, while not compromising the quality of the solution. The heuristic is, whenever an edge is deleted, the cohesive subgraph identification device 104 checks whether the degree of any end node is smaller than k, and if it is, a recursive node deletion process will be performed (i.e., as in Line 7 of FIG. 6b).

The algorithm is named "NodeFirst" figuratively because a single edge deletion may result in a complete k-Core node deletion process. Since the cohesive subgraph identification device 104 does not need to perform a complete edge deletion process as in the Zigzag algorithm does in Line 3 in FIG. 6a, NodeFirst can make the given network G(V,E) converge quicker to the set of maximal (k, d)-Cores.

Referring to FIG. 5a, in an exemplary embodiment, points $p_1$, $p_2$, $p_3$, $p_4$ and the other three nodes represent images input into the outlier and inlier detecting system 101 in the form of a K-core. The lines connecting the points show how similar the images are to each other. The line represents a strength of similarity between each image of the K-core. That is, each point in the K-core has a weight associated with it and the k-Core shows the strength of similarity between each image. The cohesive subgraph identification device 104 uses the Zigzag or NodeFirst algorithm to generate the (k, d) core which includes points $p_1$, $p_2$, $p_3$ which further increases the certainty of strength of similarity between each point as shown in the right side of FIG. 5a. That is, the algorithms determined that an edge point (i.e., point $p_4$) was to be removed and further reduce the k-Core to the (k, d)-core.

Thus, the cohesive subgraph identification device 104 identifies subgraphs (i.e., (k, d)-Core structures as shown in the right side of FIG. 5a) using either one of the algorithms and outputs the identified subgraphs to the subgraph correlation tracking and clustering device 105.

For example, as exemplary shown in FIG. 4, if exemplarily 10,000 images are input into the system and the algorithms are applied to the 10,000 images, the cohesive subgraph identification device 104 identifies multiple (k, d) cores (each image) which represent a subgraph output by the cohesive subgraph identification device 104. The cohesive subgraph identification device outputs a plurality of subgraphs each having a (k, d) core associated with the subgraph.

The subgraph correlation tracking and clustering device 105 receives the plurality of subgraphs from the cohesive subgraph identification device 104, and by correlation and measuring by propagation and aggregation process is able to combine different subgraphs together based on a similarity factor between (k, d) cores of the plurality of subgraphs.

Thus, the subgraph correlation tracking and clustering device 105 can be configured to determine a relationship between different subgraphs based on a similarity factor between the (k, d)-cores and the plurality of subgraphs output by the subgraph correlation tracking and clustering device 105. Further, the subgraph correlation tracking and clustering device 105 can be configured to combine the different subgraphs together based on the similarity factor between the (k, d)-cores of the plurality of subgraphs.

Referring to FIG. 4, in an exemplary embodiment, the left half of the image can represent one subgraph output by the cohesive subgraph identification device 104 and the right half can represent a second subgraph. Based on the similarity between the (k, d) core of each of the subgraphs, the subgraph correlation tracking and clustering device 105 combines the different subgraphs.

In an exemplary embodiment, assume that the face of interest is person X and that Person Y and Person Z are also included in the list of images input into the system, the subgraph correlation tracking and clustering device 105 can combine all subgraphs of person X (i.e., inliers) while removing all subgraphs containing Person Y and Person Z (i.e., outliers). That is to say, the detected outliers have no correlation or similarity to the image of interest.

More specifically, to calculate whether to combine different subgraphs or whether to remove the subgraphs, the subgraph correlation tracking and clustering device 105 uses a transient subgraph filtering approach.

The subgraph correlation tracking and clustering device 105 uses a propagation and aggregation (P & A) approach to measure correlations between subgraphs. The subgraph correlation tracking and clustering device 105 performs the P & A process along edges to compute the correlation between a given cluster and all other clusters.

Figure 5B:
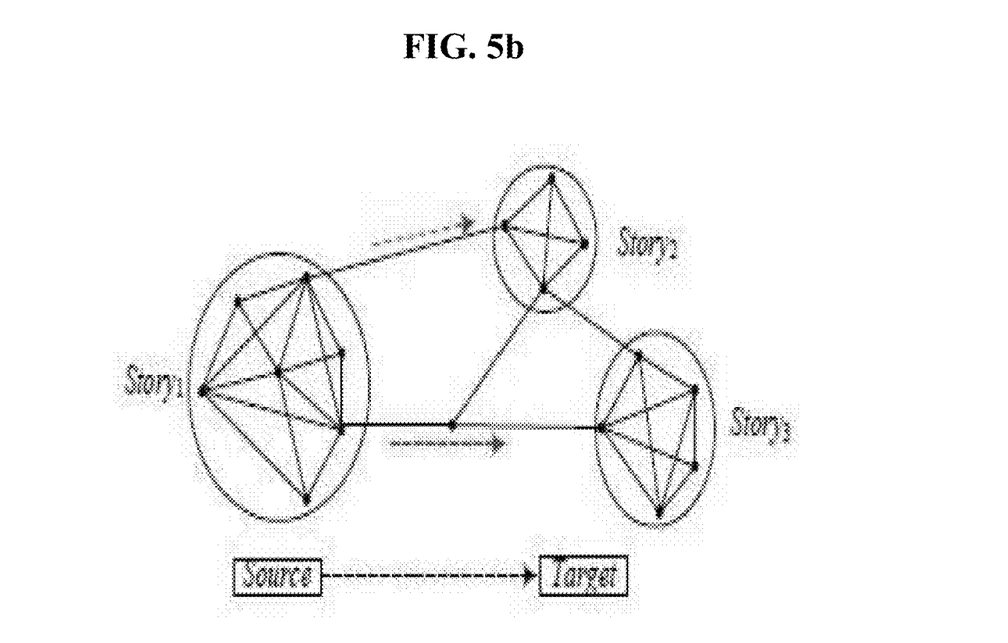
FIG. 5b exemplary shows the propagation and aggregation process from one source to multiple targets.

To start, the subgraph correlation tracking and clustering device 105 uses two kinds of nodes in the post network; source nodes and target nodes. On each iteration, each source node propagates its edge similarities to its neighborhood along paths, and meanwhile, each target node aggregates the similarities that are propagated in from their neighbors. The source and target denote the source node set and target node set respectively, as shown in FIG. 5b.

Given the maximal path length 1, path similarities aggregated by a node pj 2 Target is shown in equation (2) where $P_1(p_i, p_j)$ is the set of simple paths from $p_i$ to $p_j$ within maximal 1 hops. Sim(path) is the similarity of a path, which can be computed by multiplying all edge similarities along the path, dampened by factor c (0<c<1) on each hop.

$$PA(Source, p_j) = \Sigma\Sigma sim(Path) \quad (2)$$

For example, supposing path=$(p_i, p_{i+1}, \ldots, p_{i+x}, p_j)$ (X<L), the result is equation (3) shown below:

$$Sim(path) = c^{X+1} S(p_i + x, p_j) \quad (3)$$

Based on the above equation (3), the subgraph correlation tracking and clustering device 105 applies P & A process to the computation of story correlations. The subgraph correlation tracking and clustering device 105 measures the correlation between $SStory_i = g_i(V_i, E_i)$ and $Story_j = g_j(V_j, E_j)$ as the amount of average path similarities that are propagated and aggregated between them. Since post network is undirected, $PA(V_i, V_j) = PA(V_i, V_j)$ where Source=$V_i$, Target=$V_j$, and path similarities that are propagated from $V_i$ and aggregated at nodes in $V_j$.

Thus, the subgraph correlation tracking and clustering device 105 measures correlations between subgraphs as Corr(gi, gj) using P & A which are computed by equation (4):

$$Corr(g_i, g_j) = PA(V_i, V_j) = PA(V_i, V_j) \quad (4)$$

Figure 6C:
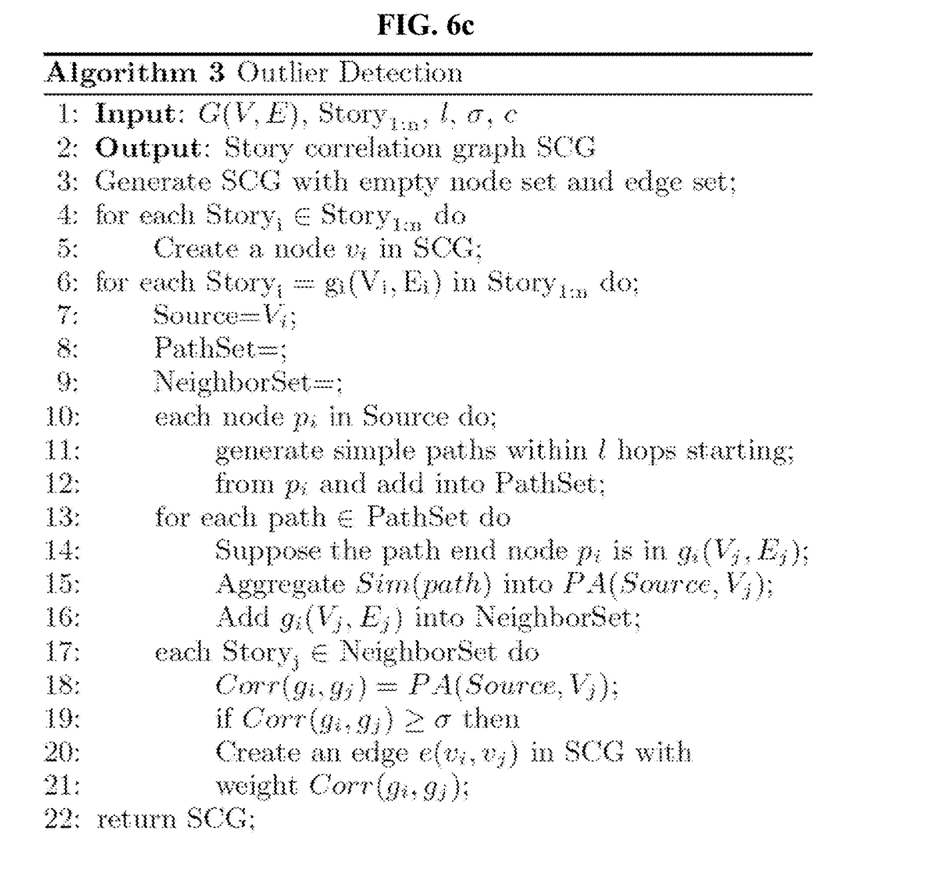
FIG. 6c exemplary shows an "Outlier Detection" algorithm used by the subgraph correlation tracking and clustering device 105.

Referring now to FIG. 6c, the subgraph correlation tracking and clustering device 105 uses algorithm 3 and the equations above to detect outliers within the input images as shown in FIG. 3. Based on the correlation between the subgraphs and similarities, the subgraph correlation tracking and clustering device 105 uses algorithm 3 of FIG. 6c and combines subgraphs to output inliers as shown in FIG. 4.

It should be noted that although images of faces were uses for the exemplary embodiments described herein, any image of an object or entity can be input into the similarity detection system 101.

Figure 2:
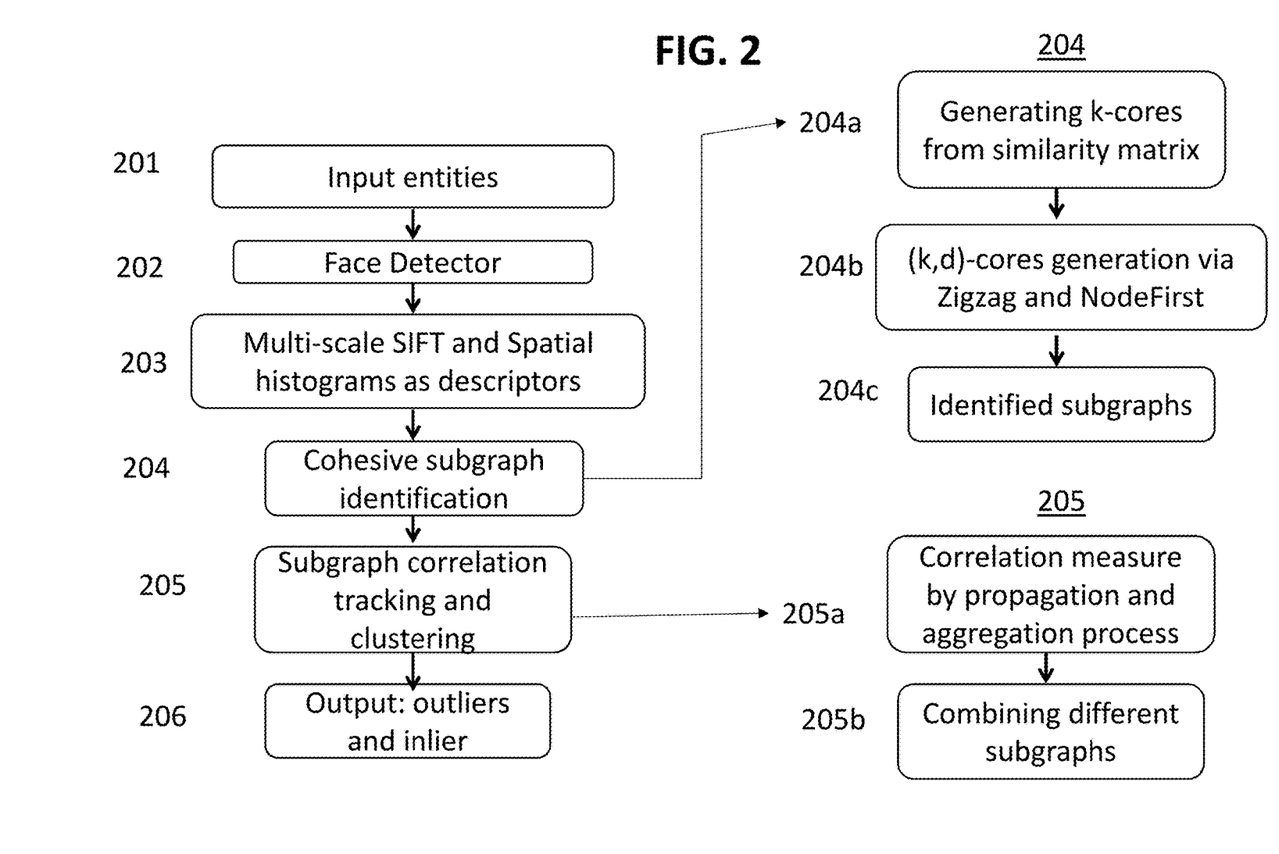
FIG. 2 exemplary shows a flowchart for a method for detecting similarities between entities.

FIG. 2 shows a high level flow chart for a similarity detecting method 200 for detecting similarities.

Step 201 inputs entities into the similarity method 200.

Step 202 performs face detection and verification by extracting a face region from the original image and extracting SHIFT feature from the face region.

Step 203 performs multi-scale SIFT and uses spatial histograms as descriptors and generates a similarity matrix between the input entities based on attributes of the input entities.

Step 204 identifies cohesive subgraphs from the input entities.

Step 204a generates k-cores from the similarity matrix.

Step 204b further generates (k, d) cores via a Zigzag algorithm (algorithm 1 as depicted in FIG. 6a) or NodeFirst algorithm (algorithm 2 as depicted in FIG. 6b).

Step 204c identifies subgraphs from the (k, d) core structure.

Step 205 uses a propagation and aggregation (P & A) approach to measure correlations between subgraphs. Step 205 determines a relationship between different subgraphs based on a similarity factor between the second parameter and the plurality of subgraphs Step 205a performs the P & A process along edges to compute the correlation between a given cluster and all other clusters.

Step 205b combines different subgraphs together based on a similarity factor between (k, d) cores of the plurality of subgraphs.

Step 206 outputs outliers and inliers of the input entities.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the similarity detection system 101 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A similarity detection system receiving a plurality of input entities, the system comprising:
   a face detection and verification device configured to extract a face region from the plurality of input entities and to extract shift features from the face region as images, the face detection and verification device excludes items in the input entities that have facial features but are not a real face of a person;
   a multi-scale SIFT and spatial histograms device configured to transform the images into vectors including attributes of the plurality of input entities such that a distance between points on the images is detected to calculate a similarity between the images;
   a cohesive subgraph identification device configured to calculate, based on the attributes of the plurality of input entities, a first parameter and a second parameter based on the first parameter, and further configured to identify a plurality of subgraphs from the second parameter; and
   a subgraph correlation tracking and clustering device configured to determine a relationship between different subgraphs based on a similarity factor between the second parameter and the plurality of subgraphs,
   wherein the first parameter includes k-cores and the second parameter includes (k, d)-cores,
   wherein the subgraph correlation tracking and clustering device is further configured to output outliers that include the subgraphs not combined by the subgraph correlation tracking and clustering device,
   wherein the subgraph correlation tracking and clustering device is further configured to divide the different subgraphs into a plurality of groups of subgraphs based on the similarity factor between the second parameter and the plurality of subgraphs,
   wherein the subgraph correlation tracking and clustering device uses source nodes and target nodes of nodes in a post network such that on each iteration, each source node propagates its edge similarities to its neighborhood along paths, and meanwhile, each target node aggregates the similarities that are propagated in from their neighbors,
   wherein given a maximal path length, path similarities aggregated by each target node are computed by multiplying all edge similarities along the path, and
   wherein the subgraph correlation tracking and clustering device measures the correlations between subgraphs to detect outliers within the images and based on the correlation between the subgraphs and similarities, the subgraph correlation tracking and clustering device combines subgraphs to output inliers.

2. The similarity detection system according to claim 1, wherein the plurality of input entities comprise a list of the images.

3. The similarity detection system according to claim 1, wherein the subgraph correlation tracking and clustering device is further configured to output inliers that include the subgraphs combined by the subgraph correlation tracking and clustering device.

4. The similarity detection system according to claim 1, wherein the attributes comprise a mathematical representation of the entities.

5. The similarity detection system according to claim 1, wherein the second parameter includes an additional factor to control a strength of the similarity factor between entities than the first parameter.

6. The similarity detection system according to claim 1, wherein the cohesive subgraph identification device calculates the second parameter using either a Zigzag algorithm or a NodeFirst algorithm.

7. The similarity detection system according to claim 1, wherein the (k, d)-cores include a cohesive internal structure enhanced by at least d common neighbors as witnesses of commonality between nodes connected by each edge than the k-cores, and
   wherein d is an integer greater than zero.

8. The similarity detection system according to claim 1, wherein the face detection and verification device identifies the face region from the plurality of input entities that is in fact the face and verifies that the region is actually the face of the person.

9. The similarity detection system according to claim 1, wherein the face detection and verification device verifies that only one face exists in the images of the plurality of input entities.

10. The similarity detection system according to claim 9, wherein the face detection and verification device identifies a number of face regions detected in the images and removes images from the input entities with multiple faces in the images.

11. A similarity detection method, comprising:
    receiving a plurality of input entities;
    extracting a face region from the plurality of input entities and shift features from the face region as images;
    excluding items in the input entities that have facial features but are not a real face of a person;
    transforming the images into vectors including attributes of the plurality of input entities such that a distance between points on the images is detected to calculate a similarity between the images;
    calculating, based on attributes of the plurality of input entities, a first parameter and a second parameter based on the first parameter;
    identifying a plurality of subgraphs from the second parameter;
    determining a relationship between different subgraphs based on a similarity factor between the second parameter and the plurality of subgraphs;
    outputting outliers that include the subgraphs not combined by the combining; and
    dividing the different subgraphs into a plurality of groups of subgraphs based on the similarity factor between the second parameter and the plurality of subgraphs,
    wherein the first parameter includes k-cores and the second parameter includes (k, d)-cores;
    using source nodes and target nodes of nodes in a post network such that on each iteration, each source node propagates its edge similarities to its neighborhood along paths, and meanwhile, each target node aggregates the similarities that are propagated in from their neighbors,
    computing, given a maximal path length, path similarities aggregated by each target node by multiplying all edge similarities along the path; and
    measuring the correlations between subgraphs to detect outliers within the images and based on the correlation between the subgraphs and similarities, and combining subgraphs to output inliers.

12. The similarity detection method according to claim 11, wherein the plurality of input entities comprise a list of the images.

13. A non-transitory computer-readable recording medium recording a similarity detection program, the program causing a computer to perform:
- receiving a plurality of input entities;
- extracting a face region from the plurality of input entities and shift features from the face region as images;
- excluding items in the input entities that have facial features but are not a real face of a person;
- transforming the images into vectors including attributes of the plurality of input entities such that a distance between points on the images is detected to calculate a similarity between the images;
- calculating, based on attributes of the plurality of input entities, a first parameter and a second parameter based on the first parameter;
- identifying a plurality of subgraphs from the second parameter;
- determining a relationship between different subgraphs based on a similarity factor between the second parameter and the plurality of subgraphs;
- outputting outliers that include the subgraphs not combined by the combining; and
- dividing the different subgraphs into a plurality of groups of subgraphs based on the similarity factor between the second parameter and the plurality of subgraphs,
- wherein the first parameter includes k-cores and the second parameter includes (k, d)-cores;
- using source nodes and target nodes of nodes in a post network such that on each iteration, each source node propagates its edge similarities to its neighborhood along paths, and meanwhile, each target node aggregates the similarities that are propagated in from their neighbors,
- computing, given a maximal path length, path similarities aggregated by each target node by multiplying all edge similarities along the path; and
- measuring the correlations between subgraphs to detect outliers within the images and based on the correlation between the subgraphs and similarities, and combining subgraphs to output inliers.

14. The non-transitory computer-readable recording medium according to claim 13, wherein the plurality of input entities comprise a list of the images.

* * * * *